United States Patent [19]
Gruber et al.

[11] 3,976,754
[45] Aug. 24, 1976

[54] METHOD FOR MAKING CYANOGEN CHLORIDE

[75] Inventors: Wilhelm Gruber, Darmstadt; Franz Schnierle, Bickenbach; Guenter Schroeder, Ober-Ramstadt, all of Germany

[73] Assignee: Röhm GmbH, Darmstadt, Germany

[22] Filed: Aug. 25, 1975

[21] Appl. No.: 607,599

[30] Foreign Application Priority Data
Sept. 3, 1974    Germany.............................. 2442161

[52] U.S. Cl. ................................................ 423/383
[51] Int. Cl.² .......................................... C01B 21/18

[58] Field of Search.................... 423/364, 371, 383; 260/248 C

[56] References Cited
UNITED STATES PATENTS
3,245,754    4/1966    Gruber et al. ...................... 423/383

*Primary Examiner*—Earl C. Thomas
*Attorney, Agent, or Firm*—Curtis, Morris & Safford

[57] ABSTRACT

A method for making cyanogen chloride which comprises passing an approximately equimolar mixture of dicyan and chlorine over a charcoal catalyst at a temperature between 500°C. and 950°C. at a space velocity between 1000 and 10000 liters, measured at room temperature, per liter of catalyst and per hour.

2 Claims, No Drawings

METHOD FOR MAKING CYANOGEN CHLORIDE

The present invention relates to a method for making cyanogen chloride from dicyan and chlorine in the presence of a charcoal catalyst.

The most important use of cyanogen chloride is, as is known, its trimerization to cyanuric chloride which, among other uses, is an intermediate in the preparation of pesticides.

Cyanogen chloride is principally made from chlorine and hydrogen cyanide, namely by the action of chlorine on a recirculating aqueous solution of hydrogen cyanide. The commercial performance of this process is described, for example, in German Pat. No. 827,358. Also, the process of making cyanogen chloride by the introduction of chlorine into a concentrated alkali cyanide solution at about 0°C. is employed on a technical scale.

German Pat. No. 1,173,882 describes a process for the preparation of cyanogen chloride by the reaction of dicyan with chlorine at temperatures of 350° – 600°C. using as a catalyst an activated charcoal prepared with a metal salt. The dosing of the charcoal catalyst with a metal salt, for example with the chlorides of sodium, calcium, magnesium, and aluminum, or the sulfates of copper, potassium, aluminum, nickel, zirconium, iron, and manganese, or still other metal salts, does not increase catalytic efficacy from the point of view of cyanogen chloride formation. Rather, the aforementioned metal salts principally hinder the subsequent trimerization, which occurs on untreated charcoal, of cyanogen chloride, which is most likely first formed, to cyanuric chloride.

This process for the preparation of cyanuric chloride from dicyan and chlorine over active charcoal in a preferred temperature region of 450° – 550°C. is the subject of German Pat. No. 1,068,265. The effect of the metal salt loading must be attributed to the inactivation, by the precipitated metal salts, of those centers of the active charcoal which promote the trimerization of cyanogen chloride. This explanation agrees with the teachings of German Offenlegungsschrift 1,695,658, which are to the effect that the formation of cyanuric chloride from dicyan and chlorine on active charcoal is favored if the catalyst is treated with an aqueous solution of an acid which is able to dissolve trace amounts of metal compounds found in the charcoal.

In carrying out the process of cyanuric chloride formation according to German Pat. No. 1,068,265, the Examples show that an equimolar mixture of dicyan and chlorine is led over the charcoal catalyst at a space velocity of about 80, i.e. about an 80-fold volume of reaction gas, based on the volume of the catalyst, is led over the active charcoal per hour. When discouraging trimerization by treating the active charcoal with a metal compound according to German Pat. No. 1,173,882, the process is operated at approximately the same space velocity as for the process according to German Pat. No. 1,068,265.

It has now been found that cyanogen chloride is formed from dicyan and chlorine using a charcoal catalyst with a surprisingly high space-time yield if the space velocity is between 1000 and 10000. In other words, from 1 to 10 $m^3$ of an approximately equimolar mixture of dicyan and chlorine are passed, per hour, through a 1 liter volume, filled with charcoal catalyst. The temperature should be maintained between 500°C. and 950°C.

It has proved advantageous to operate with a slight excess of chlorine, amounting to about 10 percent of the theoretical amount. The use of temperatures from 550° – 750°C. and of space velocities over 5000 leads to particularly high space-time-yields at product yields of 90 percent and more.

As is demonstrated in the Examples, more than 18 kg of cyanogen chloride can be produced per hour and per liter of active charcoal according to the process of the invention. It should be mentioned that a rise in temperature above 650°C. while maintaining a high space velocity of, for example, 7800, only minimally influences the amount of cyanogen chloride formed, whereas the space velocity is of decisive significance. At a space velocity of 7800, neither the yield nor the production per unit time of cyanogen chloride is increased by increasing the temperature from 650°C. (cf. Example 9) to 900°C. (cf. Example 15). In both cases, the amount of cyanogen chloride produced per hour and per liter is 18.1 kg.

A better understanding of the present invention and of its many advantages will be had by referring to the following specific examples, given by way of illustration.

EXAMPLES 1 – 15

A 50 cm high layer of coarsely-grained active charcoal was supported on a screen in a vertically-standing quartz reaction tube having an inner diameter of 50 mm. In this way, the space occupied by the catalyst was about 1 liter. The reaction tube was heatable from the exterior by a resistance heater. The temperature within the catalyst bed was measured approximately in the middle of the bed with the aid of a thermoelement.

Dicyan and chlorine were mixed in a mol ratio of 1:1.1. The space velocities in the accompanying Table pertain to the number of liters of the aforementioned gas mixture, measured at room temperature, which were passed over the charcoal catalyst per hour.

The reaction gas leaving the reactor was condensed at −10°C. and analyzed gas-chromatographically.

The following Table shows Examples from which it can be seen that at a space velocity of 260 and a reaction temperature of 510°C. in a catalyst-filled reaction volume of about 1 liter, 0.6 kg/hour of cyanogen chloride is formed and that this amount is considerably increased by increasing the temperature and the space velocity.

TABLE

| Example No. | Temperature (°C.) | Space Velocity (Liters/ liter × hour) | Yield of Cyanogen Chloride (% of Theory calculated on Dicyan) | Cyanogen Chloride (kg/liter × hour) |
|---|---|---|---|---|
| 1 | 510 | 260 | 98 | 0.6 |
| 2 | 570 | 390 | 97 | 0.9 |
| 3 | 570 | 780 | 95 | 1.9 |
| 4 | 570 | 1560 | 95 | 3.6 |
| 5 | 570 | 2600 | 97 | 6.1 |
| 6 | 620 | 1560 | 100 | 3.8 |

TABLE-continued

| Example No. | Temperature (°C.) | Space Velocity (Liters/liter × hour) | Yield of Cyanogen Chloride (% of Theory calculated on Dicyan) | Cyanogen Chloride (kg/liter × hour) |
|---|---|---|---|---|
| 7 | 620 | 2600 | 97 | 6.1 |
| 8 | 620 | 3900 | 97 | 9.2 |
| 9 | 650 | 7800 | 95 | 18.1 |
| 10 | 720 | 1560 | 98 | 3.75 |
| 11 | 720 | 3900 | 95 | 9.0 |
| 12 | 780 | 3900 | 97 | 9.2 |
| 13 | 800 | 7800 | 85 | 16.2 |
| 14 | 900 | 2600 | 92 | 5.9 |
| 15 | 900 | 7800 | 95 | 18.1 |

According to the process of the invention, space time yields are obtained which are economically interesting for the preparation of cyanogen chloride from dicyan and chlorine.

A practical application of the teachings of the present invention, with respect to the preparation of cyanuric chloride from dicyan and chlorine, is that such a process is suitably not carried out in one step, as taught in German Pat. No. 1,068,265. Rather, it is much more advantageous to prepare cyanogen chloride according to the present invention in a first process step and then to trimerize the product in a known fashion, for example according to U.S. Pat. No. 3,312,697, in a second process step.

What is claimed is:

1. A method for making cyanogen chloride which comprises passing an approximately equimolar mixture of dicyan and chlorine over a charcoal catalyst at a temperature between 500°C. and 950°C. at a space velocity between 1000 and 10000 liters, measured at room temperature, per liter of catalyst and per hour.

2. A method as in claim 1 wherein said temperature is between 550°C. and 750°C. and said space velocity is between 5000 and 8000 liters per liter of catalyst and per hour.

* * * * *